US011097210B2

(12) United States Patent
Remboski et al.

(10) Patent No.: US 11,097,210 B2
(45) Date of Patent: *Aug. 24, 2021

(54) DISPOSABLE FILTER INCLUDING AN INTEGRATED SENSOR ASSEMBLY

(71) Applicants: Neapco Intellectual Property Holdings, LLC, Farmington Hills, MI (US); Aware Mobility LLC, Ann Arbor, MI (US)

(72) Inventors: Donald Remboski, Ann Arbor, MI (US); Jacqueline Dedo, Wolverine Lake, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,713

(22) Filed: Sep. 19, 2018

(65) Prior Publication Data
US 2019/0083912 A1  Mar. 21, 2019

Related U.S. Application Data

(60) Provisional application No. 62/560,979, filed on Sep. 20, 2017, provisional application No. 62/560,854, (Continued)

(51) Int. Cl.
*B01D 35/143* (2006.01)
*B01D 35/147* (2006.01)
(Continued)

(52) U.S. Cl.
CPC .......... *B01D 35/143* (2013.01); *B01D 27/08* (2013.01); *B01D 27/101* (2013.01);
(Continued)

(58) Field of Classification Search
CPC ............... B01D 35/143; B01D 27/103; B01D 35/1435; B01D 35/06; B01D 27/101;
(Continued)

(56) References Cited

U.S. PATENT DOCUMENTS 4,626,344 A   12/1986  Fick et al.
5,089,129 A    2/1992  Brigman
(Continued)

FOREIGN PATENT DOCUMENTS

CN      201389382 Y       1/2010
CN      103338830 A  *  10/2013   ........... B01D 35/147
(Continued)

OTHER PUBLICATIONS

"Anatomy of an Oil Filter"; Machinery Lubrication, A Noria Publication; Sep. 13, 2017; 7 pages.
(Continued)

*Primary Examiner* — Nam X Nguyen
*Assistant Examiner* — Ekandra S. Miller-Cruz
(74) *Attorney, Agent, or Firm* — Dickinson Wright PLLC

(57) ABSTRACT

A disposable filter including an integrated sensor is provided for filtering a working fluid and monitoring the working fluid and/or the performance of the filter. The filter includes a housing with an inlet and an outlet with filter media disposed within the housing in a flow path defined between the inlet and the outlet. The integrated sensor is disposed within the housing, where the integrated sensor monitors a characteristic of the working fluid or other performance characteristic of the filter. The sensor assembly may include a communication module. The sensor assembly may include a RF tank circuit with a capacitor plate, which may be disposed adjacent a bypass structure that is disposed adjacent the outlet. Movement of a moveable part of the bypass
(Continued)

structure in response to a pressure buildup will cause a shift in a resonant frequency of the tank circuit.

10 Claims, 2 Drawing Sheets

Related U.S. Application Data filed on Sep. 20, 2017, provisional application No. 62/560,919, filed on Sep. 20, 2017.

(51) Int. Cl.
| | | |
|---|---|---|
| *B01D 35/30* | (2006.01) | |
| *B01D 27/08* | (2006.01) | |
| *B01D 27/10* | (2006.01) | |
| *B01D 37/04* | (2006.01) | |
| *B01D 27/14* | (2006.01) | |
| *B01D 35/00* | (2006.01) | |
| *B01D 35/06* | (2006.01) | |
| *B03C 1/28* | (2006.01) | |
| *B03C 1/30* | (2006.01) | |
| *B01D 27/04* | (2006.01) | |

(52) U.S. Cl.
CPC ......... *B01D 27/103* (2013.01); *B01D 27/108* (2013.01); *B01D 27/14* (2013.01); *B01D 35/005* (2013.01); *B01D 35/06* (2013.01); *B01D 35/147* (2013.01); *B01D 35/1435* (2013.01); *B01D 35/30* (2013.01); *B01D 37/043* (2013.01); *B01D 37/046* (2013.01); *B01D 37/048* (2013.01); *B03C 1/28* (2013.01); *B03C 1/30* (2013.01); *B01D 27/04* (2013.01); *B01D 2201/4092* (2013.01); *B01D 2201/52* (2013.01); *B01D 2201/54* (2013.01); *B01D 2201/56* (2013.01)

(58) Field of Classification Search
CPC .... B01D 27/108; B01D 27/14; B01D 35/005; B01D 37/048; B01D 37/046; B01D 37/043; B01D 27/08; B01D 35/147; B01D 35/30; B01D 2201/56; B01D 2201/54; B01D 2201/52; B01D 2201/4092; B01D 27/04; B03C 1/30; B03C 1/28
USPC .................................................. 210/223, 87
See application file for complete search history.

(56) References Cited

U.S. PATENT DOCUMENTS

| | | | |
|---|---|---|---|
| 5,858,224 A | 1/1999 | Schwandt et al. | |
| 6,366,260 B1* | 4/2002 | Carrender | G06K 19/07749 |
| | | | 343/866 |
| 6,558,444 B1* | 5/2003 | Hunter | B01D 46/003 |
| | | | 55/385.1 |
| 7,442,291 B1* | 10/2008 | Discenzo | B01D 35/143 |
| | | | 210/443 |
| 7,552,626 B2 | 6/2009 | Girondi | |
| 8,242,893 B1* | 8/2012 | Lin | C02F 1/001 |
| | | | 340/10.42 |
| 2003/0042688 A1* | 3/2003 | Davie | F16L 23/167 |
| | | | 277/590 |
| 2003/0116493 A1 | 6/2003 | Elsegood | |
| 2004/0009614 A1* | 1/2004 | Ahn | B03C 1/00 |
| | | | 436/526 |
| 2004/0026332 A1 | 2/2004 | Mouhebaty et al. | |
| 2006/0243032 A1* | 11/2006 | Liu | G01N 11/00 |
| | | | 73/53.05 |
| 2009/0243395 A1* | 10/2009 | Burke | B01D 29/52 |
| | | | 307/104 |
| 2013/0068673 A1* | 3/2013 | Maggiore | B01D 35/30 |
| | | | 210/95 |
| 2013/0180898 A1 | 7/2013 | Chajec et al. | |
| 2015/0047421 A1 | 2/2015 | Richardson | |
| 2015/0369788 A1 | 12/2015 | Andres | |
| 2017/0173505 A1* | 6/2017 | Dhingra | F01M 11/03 |

FOREIGN PATENT DOCUMENTS

| | | | | |
|---|---|---|---|---|
| CN | 103850842 A | | 6/2014 | |
| EP | 2027907 A2 | * | 2/2009 | .......... B01D 35/143 |
| GB | 2195263 A | * | 4/1988 | .......... B01D 29/10 |
| KR | 100815286 B1 | | 3/2008 | |
| WO | 2014203378 A1 | | 12/2014 | |
| WO | 2016129972 A1 | | 8/2016 | |
| WO | WO-2016129972 A1 | * | 8/2016 | .......... B01D 35/143 |
| WO | WO-2017030869 A1 | * | 2/2017 | .......... B01D 35/14 |

OTHER PUBLICATIONS

International Search Report; PCT/US2018/051847; dated Jan. 3, 2019; 4 pages.
International Search Report; PCT/US2018/051848; dated Jan. 3, 2019; 5 pages.

* cited by examiner

DISPOSABLE FILTER INCLUDING AN INTEGRATED SENSOR ASSEMBLY

CROSS-REFERENCE TO RELATED APPLICATIONS

The subject application claims the benefit of U.S. Provisional Patent Application Ser. No. 62/560,979 filed on Sep. 20, 2017 entitled "Filter System Including Integrated Diagnostics", U.S. Provisional Patent Application Ser. No. 62/560,854 filed on Sep. 20, 2017 entitled a "Disposable Filter Including an Integrated Sensor Assembly", and U.S. Provisional Patent Application Ser. No. 62/560,919 filed on Sep. 20, 2017 entitled a "Disposable Filter Including an Accessory Port", the entire disclosures of these provisional patent applications are incorporated herein by reference.

FIELD OF THE DISCLOSURE

The present disclosure relates generally to a filter for filtering a working fluid passing therethrough. More specifically, the present disclosure relates to a disposable filter which can provide information related to various characteristics of the filtered working fluid or the operational condition of the disposable filter.

BACKGROUND OF THE INVENTION

This section provides a general summary of background information and the comments and examples provided in this section are not necessarily prior art to the present disclosure.

It is known in the art for various types of machinery, e.g., automobiles, construction equipment, and manufacturing devices, to include filters for removing impurities from working fluids such as fuel, oil, gas and coolant. Cartridges of the filters are known to clog with impurities and thus must periodically be replaced. Additionally, it has been found that significant information about the working fluid and other parts of the machinery can be obtained based on characteristics of the working fluid as it passes through the filter. For example, when filtering bulk fuel delivered to a storage site, a filter system can identify contamination in the fuel and therefore identify supply chain problems. As another example, when filtering working fluid to an engine or hydraulic system, the filter system can identify abnormal chemical or physical properties of the lubricant or hydraulic fluid. Accordingly, it is known to manually conduct working fluid sampling and analysis to detect problems associated with the working fluid and other parts of the machinery for ensuring product or process fluid quality. In some cases, the filter cartridges and working fluid are manually inspected based on predetermined, static inspection schedules. It is also known for condition-based monitoring systems to be built into machines to actively monitor their working fluids. However, such condition-based monitoring systems are not readily serviceable and replaceable, and can add significant expense to the machine. Accordingly, there remains a need for improvements to such monitoring systems to reduce maintenance costs and improve machine performance, machine useful lifetime and fluid quality.

SUMMARY OF THE INVENTION

The subject invention is generally directed to a disposable filter which includes at least one integrated sensor assembly for autonomously monitoring a characteristic of the working fluid passing through the filter and/or an operational condition of the disposable filter. Thus, the disposable filter with the integrated sensor assembly can easily be incorporated into an existing filter system without necessary modifications (e.g., expensive retrofit) to advantageously allow condition-based maintenance and/or process fluid quality control to be quickly and easily added to existing filter systems, as needed and desired. In other words, the disposable filter with an integrated sensor assembly provides a convenient platform to package the sensor assembly into an existing filter system, with minimal expense.

In one aspect, a disposable filter for filtering a working fluid is provided. The disposable filter includes a housing including an inlet to be disposed in fluid communication with a working fluid and an outlet to be disposed in fluid communication with a machine. The disposable filter further includes a filter disposed within the housing for filtering the working fluid passing through the disposable filter between the inlet and outlet, and an integrated sensor assembly disposed within the housing for monitoring a characteristic of the working fluid passing through the filter and/or an operational condition of the disposable filter.

In another aspect, a filter for filtering a working fluid is provided, which includes a housing having an inlet for receiving a source of working fluid and an outlet for outputting the working fluid to a machine, and a filter media disposed within the housing in a flow path defined between the inlet and the outlet, wherein the filter is configured to allow the working fluid to pass therethrough. The filter further includes a bypass structure disposed within the housing adjacent the housing defining a bypass flow path, wherein the bypass structure includes a moveable part that moves in response to a pressure buildup within the housing. An RF tank circuit having a capacitor plate is disposed adjacent the moving part, wherein movement of the moving part shifts a resonant frequency in the RF tank circuit. A communication module is in communication with the tank circuit for communicating a status of the filter.

In another aspect, a method for monitoring a status of a filter for working fluid is provided. The method includes receiving a working fluid into a housing through an inlet, filtering the working fluid through a filter media, and outputting the fluid from the housing through an outlet. The method further includes detecting, at a sensor disposed within the housing, a status of the filter based on a monitored characteristic of the working fluid or a performance characteristic of the filter.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE ENABLING EMBODIMENTS

Example embodiments of a disposable filter which includes an integrated sensor assembly in accordance with the present disclosure will now be more fully described.

Each of these example embodiments are provided so that this disclosure is thorough and fully conveys the scope of the inventive concepts, features and advantages to those skilled in the art. To this end, numerous specific details are set forth such as examples of specific components, devices and mechanisms associated with the disposable filters to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure.

Figure 1:
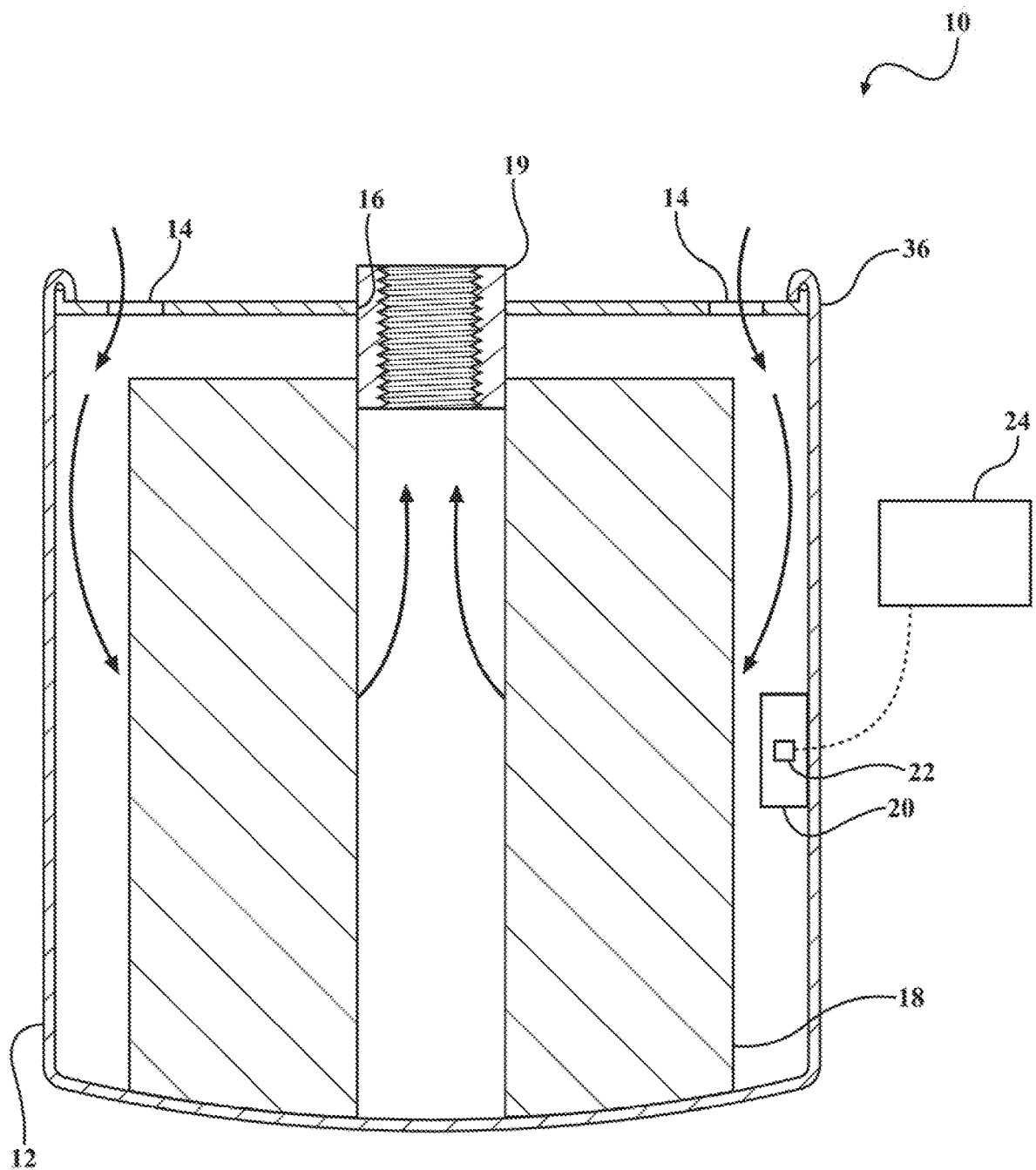
FIG. 1 illustrates a cross-sectional view of a disposable filter including an integrated filter assembly.
Figure 2:
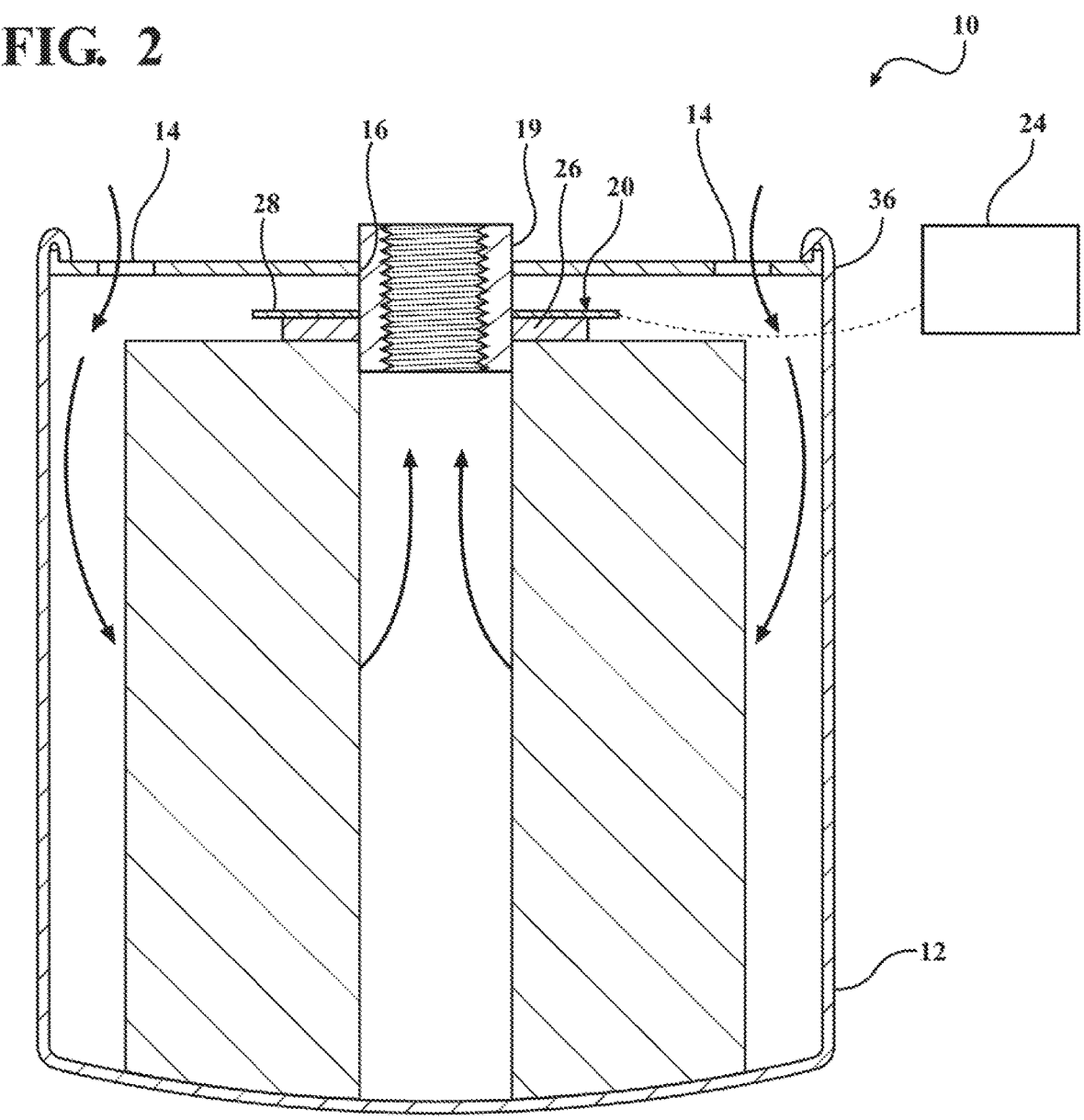
FIG. 2 illustrates a cross-sectional view of a first enabling embodiment of a disposable filter including an integrated filter assembly.

FIGS. 1-2 illustrate a disposable filter 10 in accordance with an aspect of the subject disclosure. As best shown therein, the disposable filter 10 includes a housing 12 having an inlet 14 to be disposed in fluid communication with a source of working fluid as well as an outlet 16 to be disposed in fluid communication with a machine for receiving the working fluid after passing through the disposable filter 10. Thus, the working fluid will flow into the filter 10 via the inlet 14 for filtering, and once filtered the working fluid will flow out of the filter 10 through the outlet 16 to the machine or other connected downstream component of the system to which the filter 10 is attached. In some cases, after a period of time of the filter 10 being used, the working fluid may flow through the filter 10 without being substantially filtered, instead flowing through a bypass path in which the working fluid is not substantially filtered.

To perform the filtering, a filter media 18 is disposed within the housing 12 in a path of fluid communication between the inlet and outlet 14, 16 for filtering the working fluid prior to its delivery to the intended machine. Thus, a filtering flow path is defined between the inlet 14 and the outlet 16 where the working fluid flows through the filter media 18. A threaded, female connector 19 is disposed adjacent a top portion of the filter housing 12 for allowing the disposable filter 10 to be threaded onto a corresponding male connector of a filter system to allow for easy attachment of the disposable filter 10 (i.e., a disposable "spin-on" type filter). In one embodiment, the outlet 16 is defined by the female connector 19, with the inlet 14, which may be in the form of multiple openings, is disposed radially outside of the female connector 19. It will be appreciated that other physical arrangements of the filter 10 and its inlet 14 and outlet 16 may be used.

As best illustrated in FIGS. 1 and 2, the disposable filter 10 includes an integrated sensor assembly 20, which is also disposed within the filter housing 12 and thus is integrated into the disposable filter 10 when connected to the existing filter system, for measuring and monitoring a desired characteristic of the working fluid passing through the disposable filter 10—such as the working fluid pressure, temperature, viscosity, flow rate, electrical properties, magnetic properties—or any other filter performance characteristic(s) of interest. In a preferred arrangement, the integrated sensor assembly 20 includes a communication module 22, such as an antenna, RFID tag, or the like, for wirelessly communicating the measured/monitored characteristic of the working fluid or the disposable filter 10 to a controller 24 disposed remotely from the disposable sensor 10. However, the communication module 22 can also be wired to the controller 24 without departing from the scope of the subject disclosure.

According to an aspect of the disclosure, the monitored characteristics of the working fluid or the performance characteristic(s) of the disposable filter 10 can then be analyzed by the controller 24 to autonomously determine the condition of the disposable filter 10 or the working fluid passing therethrough. This data can then be utilized to determine if the disposable filter 10 and the machine in communication with the filtered working fluid are in proper operating condition or alternatively need service or replacement. For example, based on complete or nearly complete operating history of the disposable filter 10 and the working fluid passing therethrough, an optimal maintenance schedule and a prediction of the machine's remaining useful life can be determined. Accordingly, as will be appreciated by the subject disclosure, the integration of a sensor assembly 20 into the disposable filter 10 provides a low-cost approach to implementing condition-based maintenance of the disposable filter 10 and working fluid quality control into an existing filter system without the need for an expensive retrofit. Furthermore, given the low expense of the sensor assembly 20 integrated into the disposable filter 10, the disposable filter 10 can simply be discarded after cycling through its useful life.

As best illustrated in FIG. 2, according to one aspect, the disposable filter 10 can include a pressure bypass structure 26, such as a bypass valve, or the like, disposed adjacent the fluid outlet 16 for maintaining a predetermined pressure within the disposable filter 10. The integrated sensor assembly 20 can include an RF tank circuit 28 which is comprised of a polyamide substrate and is disposed adjacent the pressure bypass structure 26 for the purpose of detecting and monitoring the operation of the pressure bypass structure 26.

The bypass structure 26 may be in the form of a flange-like structure that extends radially outward from the female connector 19, and may be configured to open in response to a pressure buildup within the filter 10. For example, if the filter becomes clogged or otherwise is not filtering the working fluid adequately such that a pressure builds up within the filter 10 and exceeds a predetermined pressure, the bypass structure 26 will open, thereby allowing the working fluid to bypass the filtering flow path that includes the filter media 18, and the working fluid may instead flow through a bypass flow path that does not include the filter media 18. Accordingly, the machine or other downstream connected component will not be deprived of the working fluid, which can could lead to failure. However, it is desirable for the working fluid to be filtered, and it is therefore desirable to communicate whether the working fluid is flowing through the bypass path and not through the filter media 18.

Figure 3:
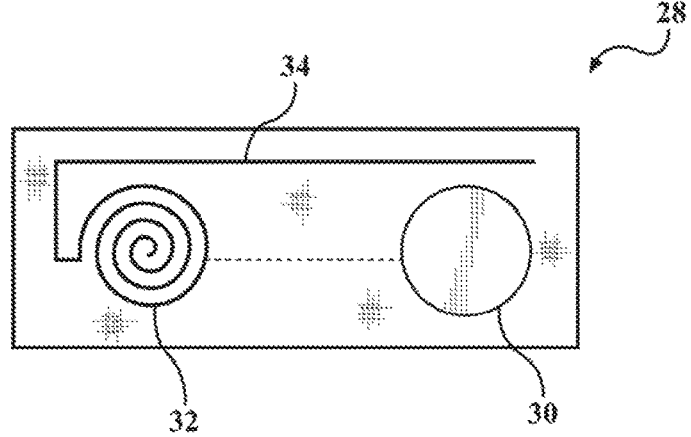
FIG. 3 illustrates an RF tank circuit of the integrated filter assembly incorporated into the first enabling embodiment of the disposable filter.

As best illustrated in FIG. 3, the RF tank circuit 28 includes a capacitor plate 30 which is to be disposed near a moveable or moving part of the pressure bypass structure 26. The capacitor plate 30 is disposed in electrical communication with a spiral coil inductor 32, which is disposed in electrical communication with an antenna 34 to serve as the communication module 22. The capacitor plate 30 may have a first resonant frequency under nominal filter conditions, such as conditions when the filter 10 is operating as desired to filter the working fluid.

Because the capacitor plate 30 is disposed near the moving part of the pressure bypass structure 26, the movement of the pressure bypass structure 26 in response to a pressure across the disposable filter 10 causes a resonant frequency of the RF tank circuit 28 to shift from its nominal resonant frequency. In other words, an opening of the bypass valve 26 changes the capacitance of the resonant (tank) circuit 28, which allows the integrated sensor assembly 20 to monitor a pressure change across the disposable filter 10.

In a preferred arrangement, a working voltage can be coupled into the RF tank circuit 28 using inductive, capacitive, or RF means with suitable rectification. Correspondingly, an RF resonance back from the RF tank circuit 28 can be read using swept frequency in bounded or unbounded media. For example, the resonant frequency of the tank circuit 28 may be detected by a number of means, such as swept frequency and impedance measurement, impulse response, Chirp Z or DFT response of tank circuit 28 to band limited pseudo random noise, phase locked loop tracing of tank resonance, as well as others. Additionally, signals may be coupled to the tank circuit 28 from an RF source/receiver by unbalanced wiring (single wire), differential wiring (two wire), unbounded RF signaling, capacitive coupling, or inductive coupling.

As best illustrated in FIGS. 1-2, the disposable filter 10 includes a gasket 36 which encircles or is disposed around a top portion of the disposable filter 10. In a preferred arrangement, the gasket 36 is made of a material transparent to RF for minimizing interference with the detected resonance frequency of the tank circuit 28. Furthermore, the antenna 34 could extend into this gasket 36 to make the gasket 36 part of and an extension of the communication module 22 of the integrated sensor assembly 20.

According to other aspects, various other sensor assemblies 20 can be integrated into the disposable filter 10 depending on the desired characteristic to be monitored/measured in the filter system. For example, the integrated sensor assembly 20 can include a magnetic getter which is combined with an electrical coil to establish a structure that exhibits changes in electrical properties due to the accumulation of magnetic particles gathered from the working fluid. This can then serve as the basis of a getter loading measurement. In another example, the integrated sensor assembly 20 can include RFID tags which are fitted with integrated circuits that contain temperature or humidity sensitive elements, which can alter the tag's data field. In yet another example, the integrated sensor assembly 20 can include a battery powered monitor circuit using RF coupling and digital or analog protocols to exchange data on a continuous or periodic basis. In yet another example, the integrated sensor assembly 20 can be programmed to include an electronic serial number/part number so that the disposable filter 10 can be remotely tracked.

According to another aspect, the integrated sensor assembly 20 can be in the form of or include a mechanical means for communicating a status of the working fluid or disposable filter 10. For example, the mechanical means of the sensor assembly 20 can include a sight glass to observe the working fluid passing through the filter 10. Alternatively, the mechanical means can include a resettable temperature flag, a resettable pressure flag, or a resettable filter bypass flag. In yet another example, the mechanical means can include a built-in getter and inspection window for observing the fluid and getter activity. The getter includes a magnet which is used to accumulate ferromagnetic particles in order to observe a change in either induction near a coil or a visual build-up of material on the getter structure. If significant change or build-up is observed, this provides an indication of an event with either the working fluid and/or a machine that requires immediate follow-up.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A disposable filter for filtering a working fluid comprising:
   a housing including a threaded end having a threaded female connector for allowing the disposable filter to be threaded onto a corresponding male connector of a filter system;
   said housing including an inlet disposed radially outside of the threaded female connector for being disposed in fluid communication with a working fluid and an outlet defined by the threaded female connector for being disposed in fluid communication with a machine;
   a filter disposed within the housing for filtering the working fluid passing through the disposable filter between the inlet and the outlet;
   a pressure sensor disposed entirely within the housing for monitoring an operational condition of the disposable filter;
   a bypass structure including a flange-like structure extending radially outward from the threaded female connector and movable in response to a predetermined pressure within the filter to open the bypass structure and allow the working fluid to bypass the filter and exit through the outlet; and
   the pressure sensor comprised of an RF tank circuit disposed within the housing adjacent the bypass structure and including a capacitor plate extending adjacent the flange-like structure and configured to sense movement of the flange-like structure of the bypass structure to shift a resonant frequency of the RF tank circuit and monitor a pressure change across the filter.

2. The disposable filter as set forth in claim 1, wherein the RF tank circuit includes a communication module for wirelessly communicating the shift in resonant frequency to a controller disposed remotely from the disposable filter.

3. The disposable filter of claim 2, wherein the communication module is in the form of an antenna.

4. The disposable filter of claim 2, wherein the controller autonomously determines a condition of the filter based on the shift in resonant frequency received from the communication module.

5. The disposable filter of claim 2, wherein the controller determines a maintenance schedule or a remaining useful life of the filter.

6. The disposable filter of claim 3, wherein the RF tank circuit includes a spiral coil inductor disposed in communication with the antenna and the capacitor plate.

7. The disposable filter of claim 6, wherein the antenna extends into a gasket.

8. The disposable filter of claim 6, further comprising a gasket disposed around a top portion of the disposable filter and comprised of a material being transparent to RF for minimizing interference with the resonant frequency of the RF tank circuit.

9. The disposable filter of claim 1, wherein the RF tank circuit extends radially outward from the threaded female connector in overlaying relationship with the flange-like structure.

10. The disposable filter of claim 1, wherein the RF tank circuit is comprised of a polyamide substrate.

* * * * *